Aug. 13, 1929.　　　C. SPEAR　　　1,724,431
BUMPER
Filed Oct. 22, 1928
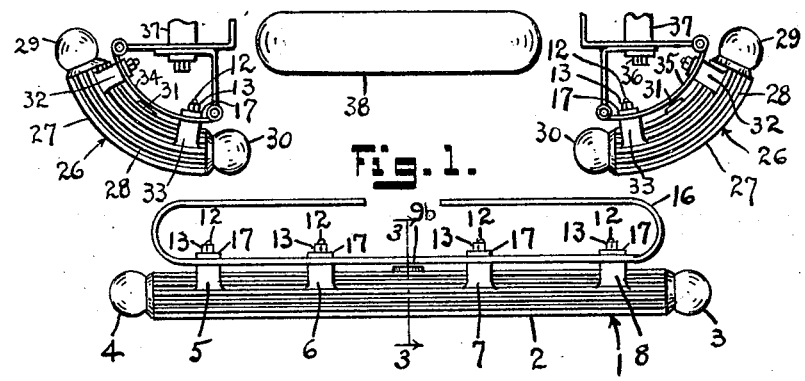
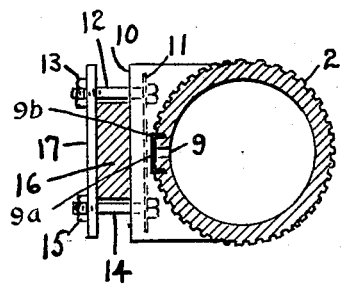
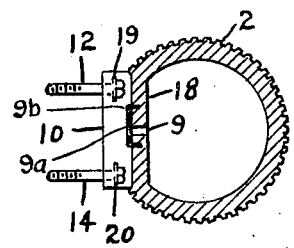
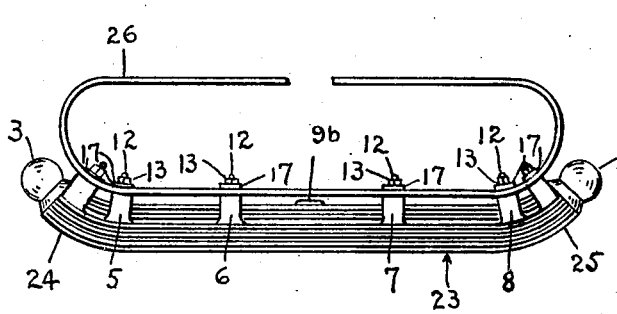
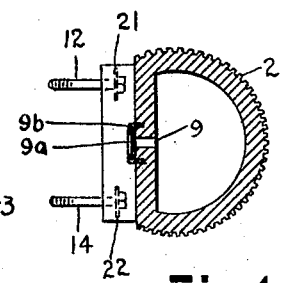
Cameron Spear
Inventor
Charles O. Clark.
By Attorney Patented Aug. 13, 1929.

1,724,431

UNITED STATES PATENT OFFICE.

CAMERON SPEAR, OF OAK TREE, NEW JERSEY.

BUMPER.

Application filed October 22, 1928. Serial No. 314,129.

My invention relates to bumpers and refers more particularly to automobile bumpers, either front, back or both front and back, resilient bumpers adapted to be attached to an automobile steel bumper already on the car or the combination of a resilient bumper and steel bumper attachable to a car as a unit.

One object of my invention is to provide a bumper that will act as a cushion between the object being bumped and the vehicle to which it is attached.

Another object of my invention is to provide a bumper of resilient material, ribbed for stiffness and having a series of projecting bosses integral therewith with attaching means moulded therein.

A further object of my invention is to provide a hollow bumper wholly enclosed with the exception of a small screened vent and having a plurality of flat bosses holding bolts therein.

I attain these results by the means illustrated in the accompanying drawings, wherein similar parts are given like numerals throughout the several views, in which:—

Figure 1, is a plan of curved bumperettes attachable to standard steel bumperettes on the back of a vehicle.

Figure 2, is a plan of a straight bumper attached to a standard steel bumper on the front of a vehicle.

Figure 3, is an enlarged section, taken on lines 3—3 of Figure 2.

Figure 4, is an enlarged section, of a modification of Figure 3.

Figure 5, is an enlarged section of a modification of Figure 3.

Figure 6, is a plan of a bumper with a curved end attached to a standard steel bumper on the front of a vehicle.

Referring to Figure 2, the bumper 1, comprises a tube, preferably composed of rubber, corrugated or ribbed at 2, having closed, ball shaped ends 3 and 4, and four bosses 5, 6, 7 and 8, or as many more as may be desired, which bosses are made integral with the tube and the tube is provided with a screened vent 9, the screen 9ª, being detachably held to the tube by the part 9ᵇ, said vent preferably located between the bosses 6 and 7.

Referring to Figure 3, the bosses shown have a flat surface 10, and the plate 11, moulded therein, which plate acts as a retainer for the bolts 12 and 14, with the nuts 13 and 15, To hold this bumper upon a standard steel bumper as 16, shown in Figures 2 and 3, the plate 17, acts as a washer to hold the bumper 1, upon this part 16.

Referring to Figure 5, which illustrates a modification of Figure 3, the tube has a flat back 18, and each bolt 12 and 14, is held by the separate plates 19 and 20, and in Figure 4, the tube is D shaped and there are two plates 21 and 22, utilized to hold the bolts 12 and 14.

The bumperettes, shown in Figure 1, applied to the back of a vehicle, each of said bumperettes 26, comprising a curved hollow tube 27, corrugated at 28, closed at the ball shaped ends 29 and 30, and provided with a screened vent 31, and having two bosses 32 and 33, such as are shown in Figures 2, 3, 4, 5 and 6, and held in any suitable way, such as is shown in Figure 3, to the steel bumperette 34 or 35, which are fastened by the bolts 36, to the spring 37, of the vehicle, said bumperettes being each side of the spare tire 38, and it is obvious that a plurality of these bumperettes may be used if desired.

Having thus described and illustrated the preferred embodiment of my invention, I do not wish to limit myself to the exact construction or arrangement of parts shown, since it is evident that modifications may be made therein without departing from the spirit of the invention or scope of the claims.

I claim:—

1. In a bumper, a hollow, grooved, closed tube with rounded ends and a single screened air vent therein, said tube provided with a plurality of flat bosses on the outside thereof having bolts carried by a plate imbedded therein.

2. In a bumper, a hollow, grooved, closed tube with rounded ends and a single screened air vent therein, said tube provided with a plurality of flat bosses on the outside thereof carrying bolts and plate washers moulded therein.

3. In a bumper, a hollow, ribbed, closed tube D shaped in section having a screened air vent and provided with a plurality of flat bosses, said bosses holding a bolting means.

4. In a bumper, a hollow, ribbed, closed tube having a screened air vent, and its ends curved to conform with the curvature of the means upon which it is mounted, said tube provided with a plurality of flat bosses integral therewith holding plate washers and bolts.

5. In a bumperette, a curved, hollow, ribbed, closed tube having a screened vent, said bumperette provided with a plurality of flat bosses integral therewith adapted to hold a bolting means.

Signed at New York in the county of New York and State of New York this 17th day of October, 1928.

CAMERON SPEAR.